United States Patent
Piascik et al.

(10) Patent No.: US 10,097,054 B2
(45) Date of Patent: Oct. 9, 2018

(54) METHODS FOR MANUFACTURING HIGH TEMPERATURE LAMINATED STATOR CORES

(71) Applicant: HONEYWELL INTERNATIONAL INC., Morristown, NJ (US)

(72) Inventors: James Piascik, Randolph, NJ (US); Reza Oboodi, Morris Plains, NJ (US); Paul Chipko, Blairstown, NJ (US); Martin Carlin Baker, Budd Lake, NJ (US); Jimmy Wiggins, Chandler, AZ (US); Leroy Allen Fizer, Huntington Beach, CA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 688 days.

(21) Appl. No.: 14/609,752

(22) Filed: Jan. 30, 2015

(65) Prior Publication Data
US 2016/0226323 A1 Aug. 4, 2016

(51) Int. Cl.
*H02K 15/00* (2006.01)
*H02K 1/18* (2006.01)
(Continued)

(52) U.S. Cl.
CPC ........... *H02K 1/18* (2013.01); *H01F 41/0233* (2013.01); *H02K 1/04* (2013.01); *H02K 15/02* (2013.01);
(Continued)

(58) Field of Classification Search
CPC ......... Y10T 29/49009; Y10T 29/49012; Y10T 29/49078; Y10T 29/53143; Y10T 29/5317;
(Continued)

(56) References Cited

U.S. PATENT DOCUMENTS 3,029,403 A    4/1962  Krueger
3,418,710 A    12/1968 Siedel et al.
(Continued)

OTHER PUBLICATIONS

EP Office Action for Application No. 16152838.5 dated Jan. 5, 2018.
EP Extended Search Report for Application No. 16152838.5-1904.

*Primary Examiner* — Thiem Phan
(74) *Attorney, Agent, or Firm* — Lorenz & Kopf, LLP

(57) ABSTRACT

Embodiments of laminated stator cores suitable for usage in high temperature applications are provided, as are embodiments of methods for manufacturing high temperature laminated stator core. In one embodiment, the method includes obtaining a plurality of coated laminates each comprising a laminate over which a coating precursor layer is formed. The coating precursor layer contain inorganic dielectric particles having a softening point. The plurality of coated laminates are arranged in a laminate stack, which is then fired at temperatures equal to or greater than the softening point of the inorganic dielectric particles. During firing, a compressive force is applied to the laminate stack sufficient to consolidate the inorganic dielectric particles into a plurality of coherent interlaminate dielectric layers electrically insulating and bonding together the plurality of coated laminates as the high temperature laminated stator core.

18 Claims, 7 Drawing Sheets

(51) Int. Cl.
*H02K 1/04* (2006.01)
*H02K 15/02* (2006.01)
*H02K 15/12* (2006.01)
*H01F 41/02* (2006.01)
*H01F 1/18* (2006.01)

(52) U.S. Cl.
CPC .............. *H02K 15/12* (2013.01); *H01F 1/18* (2013.01); *H02K 2201/09* (2013.01); *Y10T 29/49009* (2015.01)

(58) Field of Classification Search
CPC ...... Y10T 29/5191; H02K 15/02; H02K 1/16; H02K 15/0012; H01F 27/24; C23C 8/10
USPC .......... 29/596, 428, 598, 602.1, 603.14, 609
See application file for complete search history.

(56) References Cited

U.S. PATENT DOCUMENTS

| | | |
|---|---|---|
| 3,456,224 A | 7/1969 | Hortsman |
| 3,483,052 A | 9/1969 | Siedel et al. |
| 4,025,379 A | 5/1977 | Whetstone |
| 4,103,195 A | 7/1978 | Torossian et al. |
| 4,227,108 A | 10/1980 | Washizu et al. |
| 4,591,529 A | 5/1986 | Behringer et al. |
| 4,608,297 A | 8/1986 | Shimada et al. |
| 4,677,036 A | 6/1987 | Nakamura et al. |
| 5,632,942 A | 5/1997 | Yeh et al. |
| 6,509,687 B1 | 1/2003 | Natarajan et al. |
| 6,974,385 B2 | 12/2005 | Natarajan et al. |
| 7,077,919 B2 | 7/2006 | Wood et al. |
| 7,235,910 B2 | 6/2007 | Decristofaro et al. |
| 7,262,527 B2 * | 8/2007 | Neal .................. G11B 19/2009 29/596 |
| 7,375,609 B2 | 5/2008 | Suzuki et al. |
| 7,510,766 B2 | 3/2009 | Lemieux |
| 7,788,792 B2 | 9/2010 | Meacham et al. |
| 8,288,915 B2 | 10/2012 | Dollé et al. |
| 2003/0201428 A1 | 10/2003 | Fukushima et al. |
| 2014/0216943 A1 | 8/2014 | Fontana, Jr. et al. |
| 2015/0314563 A1 * | 11/2015 | Fluch ..................... B32B 15/08 428/457 |

\* cited by examiner

METHODS FOR MANUFACTURING HIGH TEMPERATURE LAMINATED STATOR CORES

TECHNICAL FIELD

The present invention relates generally to electromagnetic devices and, more particularly, to laminated stator cores suitable for usage within electromagnetic devices subject to highly elevated operating temperatures, as well as to methods for manufacturing laminated stator cores.

BACKGROUND

Electromagnetic devices, such as motors, sensors, generators, and actuators, commonly include spoked stator cores supporting a number of electromagnetic coils. During operation of the electromagnetic device, the electromagnetic coils magnetically interact with a rotor to provide the desired transducer functionality, such as converting electrical signals to rotor rotation, converting rotor rotation to electrical signals, or converting rotor rotation to power generation. The electromagnetic coils are wound around or inserted over the spokes or posts of the stator core, which is at least partially composed of a magnetically-permeable alloy, such an electrical steel. Cost savings can be realized by producing the stator core as a monolithic structure composed entirely of the magnetically-permeable alloy. Alternatively, the stator core can be produced from laminated stack of magnetically-permeable plates or "laminations," which are separated by intervening dielectric layers (referred to herein as "interlaminate dielectric layers"). While more costly than solid stator cores, laminated stator cores can significantly reduce eddy current loses and, in turn, enhance the efficiency and power density of the electromagnetic device into which the stator core is integrated. As conventionally produced, however, laminated stator cores are generally unsuitable for usage in high temperature applications, such as applications characterized by operating temperatures exceeding about 260 degrees Celsius (° C.) or about 500 degrees Fahrenheit (° F.).

Any one of a number of factors can contribute to the temperature limitations of conventional laminated stator cores. In many cases, laminated stator core temperature limitations are due to the presence of organic dielectric materials within the stator core. As do organic materials, generally, such organic dielectric materials tend to breakdown and decompose at elevated temperatures exceeding the aforementioned threshold. Other factors that can limit the thermal tolerances of laminated stator cores include degradation of the electrically-insulative properties of the interlaminate dielectric due to unfavorable interactions with the laminate alloy under high temperature operating conditions (e.g., mass migration of metal ions from the laminate into the dielectric) and/or the rapid oxidation of the laminates when exposed to air under high temperature conditions. In the majority of applications, such temperature limitations are immaterial as the laminated stator cores are not exposure to such highly elevated operating temperatures. However, in applications wherein the stator cores are subject to such temperatures, the thermal capabilities of conventional laminated stator cores can be undesirably limiting. Such applications can include, but are not limited to, utilization of the laminated stator cores within electromagnetic devices, such as motors, sensors, actuators, generators, or magnetic bearings, deployed within the hot section of a gas turbine engine.

There thus exists an ongoing demand for the provision of laminated stator cores capable of prolonged and reliable operation in highly elevated temperature environments, such as environments characterized by temperatures exceeding about 260° C. (~500° F.) and, possibly, approaching or exceeding about 500° C. (~930° F.). It is also desirable to provide embodiments of a method for manufacturing such high temperature laminated stator cores. Other desirable features and characteristics of the present invention will become apparent from the subsequent Detailed Description and the appended Claims, taken in conjunction with the accompanying Drawings and the foregoing Background.

BRIEF SUMMARY

Methods for manufacturing laminated stator cores suitable for usage in high temperature electromagnetic devices are provided. In one embodiment, the method includes obtaining a plurality of coated laminates each comprising a laminate over which a coating precursor layer is formed. The coating precursor layer contain inorganic dielectric particles having a softening point. The plurality of coated laminates are arranged in a laminate stack, which is then fired at temperatures equal to or greater than the softening point of the inorganic dielectric particles. During firing, a compressive force is applied to the laminate stack sufficient to consolidate the inorganic dielectric particles into a plurality of coherent interlaminate dielectric layers electrically insulating and bonding together the plurality of coated laminates as the high temperature laminated stator core.

In a further embodiment, the method includes forming oxidation barrier layers on a plurality of laminates and depositing layers of a coating precursor layer (e.g., a glass-containing paste) material over the oxidation barrier layers. The coating precursor material contains glass particles and an organic binder. The organic binder is then thermally decomposed from the layers of coating precursor layer material after deposition thereof. Prior to or after thermally decomposing the organic binder, the plurality of laminates is laid-up in a laminate stack such that the layers of the coating precursor material are interleaved with the plurality of laminates. The laminate stack is then fired at predetermined processing temperatures exceeding a softening point of the glass particles, while a controlled compressive load is exerted thereon to consolidate the glass particles into a number of interlaminate dielectric layers interleaved with the plurality of laminates.

Embodiments of high temperature laminated stator cores are further provided. In one embodiment, the high temperature laminated stator core includes a plurality of laminates each composed of a magnetically-permeable material, such as an iron-cobalt alloy. A plurality of interlaminate dielectric layers is interspersed or interleaved with the plurality of laminates in an alternating arrangement. The plurality of interlaminate dielectric layers electrically insulate and bond together the plurality of laminates. Additionally, the plurality of interlaminate dielectric layers contain consolidated glass particles having a softening point less than the melt point of the magnetically-permeable material and having a coefficient of thermal expansion (CTE) less than the CTE of the magnetically-permeable material.

BRIEF DESCRIPTION OF THE DRAWINGS

At least one example of the present invention will hereinafter be described in conjunction with the following figures, wherein like numerals denote like elements, and.

Figure 1:
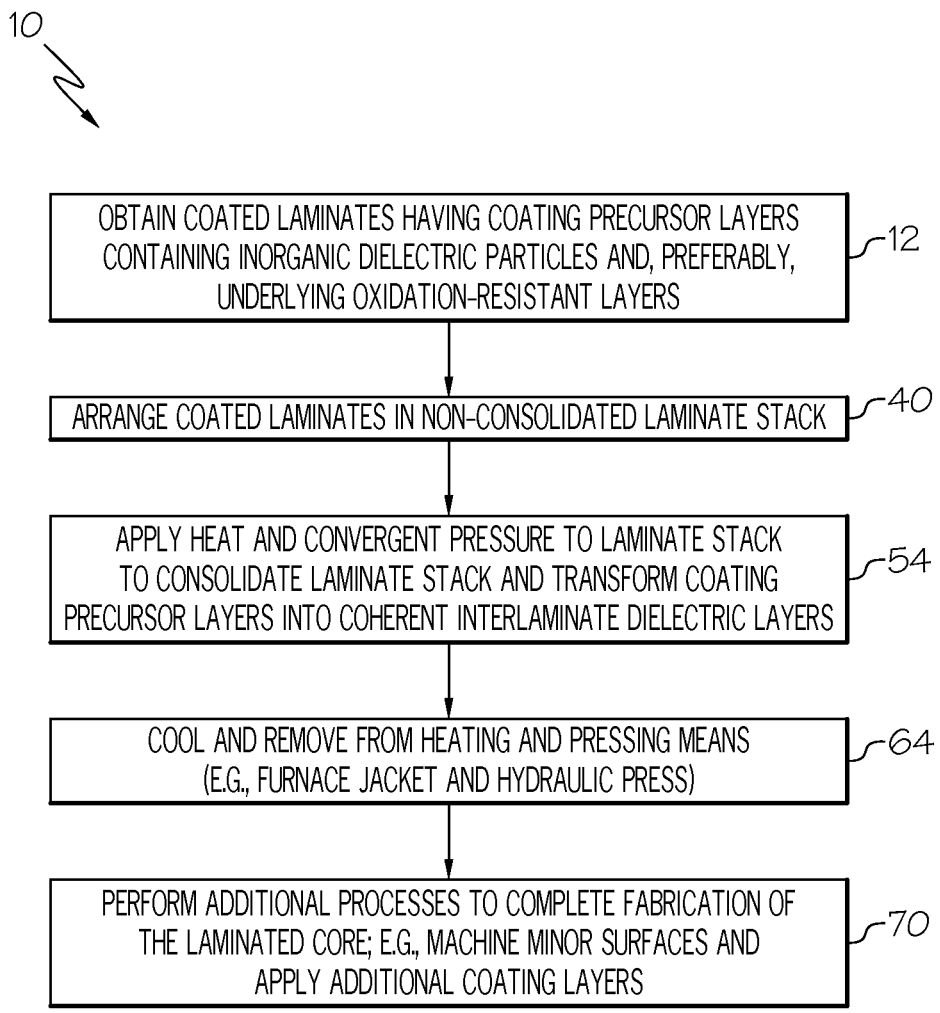
FIG. 1 is flowchart setting-forth an exemplary embodiment for manufacturing laminated stator cores suitable for usage in high temperature operating environments, as illustrated in accordance with an exemplary embodiment of the present invention.

For simplicity and clarity of illustration, the drawing figures illustrate the general manner of construction, and descriptions and details of well-known features and techniques may be omitted to avoid unnecessarily obscuring the exemplary and non-limiting embodiments of the invention described in the subsequent Detailed Description. It should further be understood that features or elements appearing in the accompanying figures are not necessarily drawn to scale unless otherwise stated. For example, the dimensions of certain elements or regions in the figures may be exaggerated relative to other elements or regions to improve understanding of embodiments of the invention.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description. Terms such as "over," "under," "on," and the like are utilized to indicate relative position between two structural elements or layers and not necessarily to denote physical contact between structural elements or layers. Thus, a first structure or layer may be described as fabricated "over" or "on" a second structure, layer, or substrate (e.g., laminate) without indicating that the first structure or layer necessarily contacts the second structure, layer, or substrate (e.g., laminate) due to, for example, presence of one or more intervening layers. Furthermore, the term "metal" is utilized herein to encompass both relatively pure metals, as well as alloys. Finally, the term "about," as appearing herein, denotes a disparity of less than 10%.

The following describes embodiments of laminated stator cores and methods for manufacturing laminated stator cores having exceptionally high thermal tolerances. Embodiments of the laminated stator cores can provide prolonged and reliable operation in environments characterized by temperatures exceeding about 260° C. (~500° F.) and, in certain cases, temperatures approaching or exceeding about 500° C. (~930° F.). Laminated stator cores having such high thermal tolerances are referred to herein as "high temperature laminated stator cores," while electromagnetic devices containing high temperature laminated stator cores and also having such high thermal tolerances are likewise referred to as "high temperature electromagnetic devices."

By virtue of their exceptionally high thermal tolerances, as well as the high efficiencies and power densities afforded by laminated core designs, embodiments of the laminated stator cores are well-suited for integration into electromagnetic devices utilized within high temperatures applications including, but not limited to, Gas Turbine Engine (GTE) applications, oil drilling applications, and nuclear applications. As a more specific example, embodiments of the laminated stator cores can be integrated into actuators, motors, sensors (e.g., rotary variable differential transformers and motor resolvers), generators, and magnetic bearings deployed within the hot section of a GTE. Additional discussion of electromagnetic devices of this type can be found in U.S. patent application Ser. No. 13/801,476, entitled "GAS TURBINE ENGINE ACTUATION SYSTEMS INCLUDING HIGH TEMPERATURE ACTUATORS AND METHODS FOR THE MANUFACTURE THEREOF," assigned to the assignee of the present application (Honeywell International, Inc.), and filed with the United States Patent and Trademark Office on Mar. 13, 2013. This patent application is referred to hereafter as the "476 patent application," the contents of which are incorporated by reference.

FIG. 1 is a flowchart setting-forth a method 10 for manufacturing a high temperature laminated stator core, as illustrated in accordance with an exemplary embodiment of the present invention. For purposes of explanation, method 10 is described below in conjunction with the processing of an exemplary laminate (shown in FIGS. 2-7) and the production of an exemplary laminated stator core (shown in FIGS. 5-7 at various stages of manufacture). As shown and described below, the illustrated laminate and laminated stator core are provided by way of non-limiting example only. It will be appreciated that that laminated stator cores manufactured utilizing method 10 can be produced to have various other structural forms, as determined by design and application. Further, the fabrication steps described below can be performed in alternative orders, certain steps may be omitted, and additional steps may be performed in alternative embodiments of the manufacture methods. Exemplary method 10 commences by independently producing, purchasing, or otherwise obtaining a number of coated laminates from which the laminated stator core is subsequently produced (STEP 12, FIG. 1). The laminates are referred to as "coated" to indicate that each laminate has, at minimum, at least one coating precursor layer formed thereover. The coated laminates may also have other layers formed thereover, such as an oxidation barrier layer of the type described below.

Figure 2:
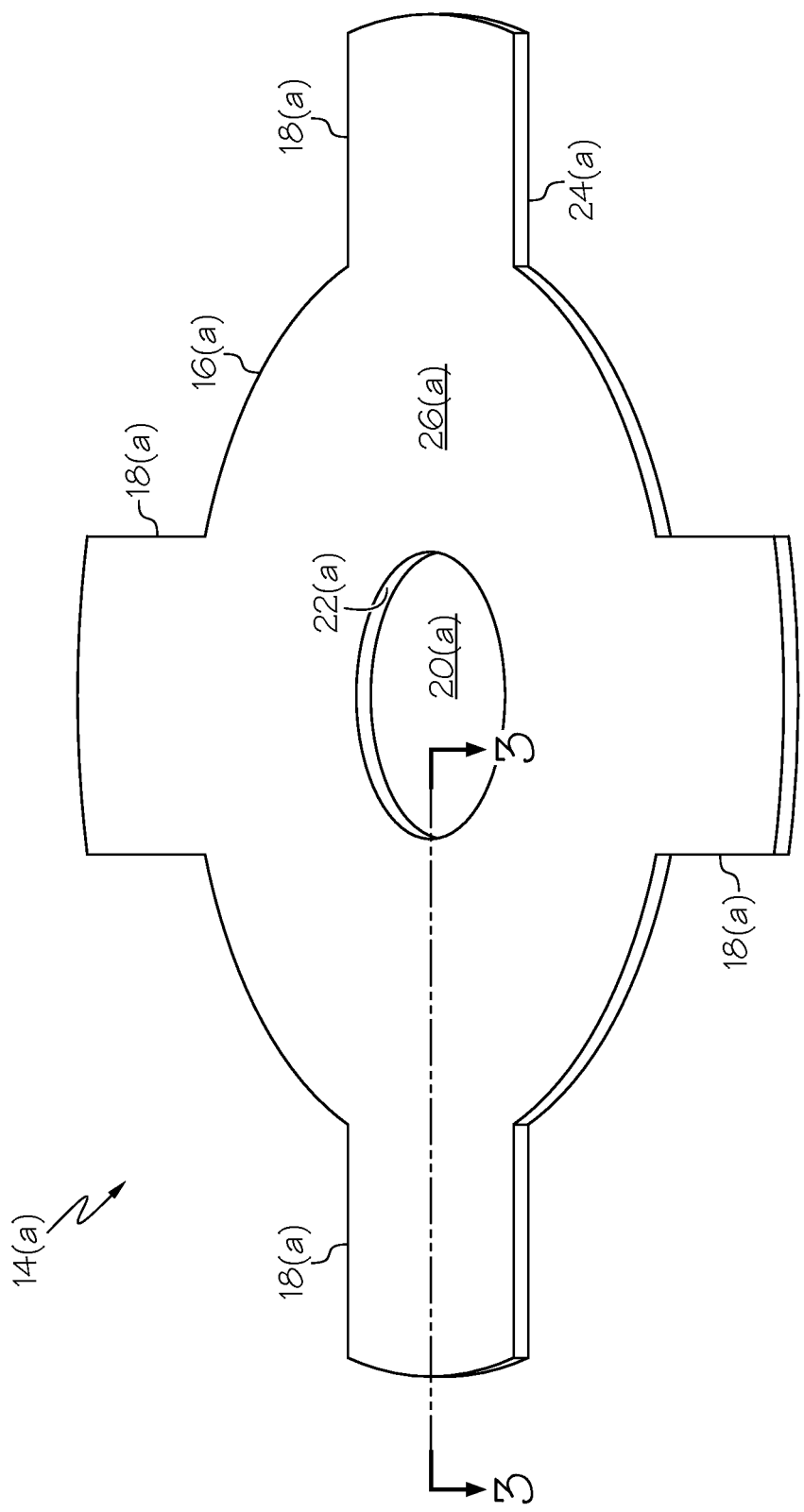
FIGS. 2 and 3 are isometric and cross-sectional views, respectively, of an exemplary laminate that can be combined with a number of similar laminates to produce the high temperature laminated stator core during performance of the exemplary manufacturing method set-forth in FIG. 1.

FIG. 2 illustrates an exemplary coated laminate 14(a) that may be obtained during STEP 12 of exemplary method 10 (FIG. 1), along with a number of similar laminates. The coating precursor and oxidation barrier layers formed over laminate 14(a) are not shown in FIG. 2 for clarity, but are shown in subsequent drawing figures and discussed below. As can be seen in FIG. 2, laminate 14(a) has a relatively thin, plate-like shape and includes a generally annular body 16(a) from which a number of projections or lobes 18(a) extend. A central opening 20(a) is formed through body 16(a) and defines an inner circumferential surface 22(a) of laminate 14(a) (also referred to as "inner sidewall 22(a)"). Laminate 14(a) further includes an outer peripheral surface 24(a) (also referred to "outer sidewall 24(a)"), an upper principal surface 26(a), and a lower principal surface 28(a). Laminate 14(a) can be composed of any suitable magnetically-permeable material and is preferably composed of an alloy containing iron as a primary constituent, such an electrical steels. In one embodiment, laminate 14(a) is composed of an alloy containing both iron and cobalt as its primary constituents (referred to here as an "Fe—Co alloy"). The Fe—Co alloy may contain lesser amounts other metallic or non-metallic constituents, such as carbon, silicon, niobium, manganese, and/or vanadium. An example of a commercially-available Fe—Co alloy from which laminate 14(a)

can be produced is identified as "Hiperco® 50 HS alloy" and marketed by CARPENTER TECHNOLOGY CORPORATION currently headquartered in Reading, Pa. In one embodiment, laminate 14(a) has a thickness between about 100 microns (μm) and about 400 μm. However, in further embodiments, laminate 14(a) may be thicker or thinner than the aforementioned range.

Laminate 14(a) can be produced by cutting the desired laminate shape from a sheet or panel of magnetically-permeable material; the term "cutting," as appearing herein, generally referring all material removal processes including etching, Electrical Discharge Machining (EDM) cutting, and laser cutting. While stamping processes can be employed in certain cases, stamping tends to impart undesired deformation and physical stress to the laminates. Additionally, stamping is prone to the creation of metal shavings or burrs, which can potentially penetrate the interlaminate dielectric layers described below and lessen the effectiveness thereof. For these reasons, laminate 14(a) is preferably fabricated from a magnetically-permeable sheet material utilizing a photo-etching process. Advantageously, photo-etching imparts minimal stress on the laminates and creates few, if any, burrs. The etch chemistry employed during the photo etch will vary in conjunction with the composition of the magnetically-permeable sheet material. However, by way of non-limiting example, a ferric chloride ($FeCl_3$) etch chemistry can be employed when the magnetically-permeable sheet material is composed of an Fe—Co alloy of the type described above. Still further cutting processes that can be utilized to produce the laminates from a selected sheet material include EDM wire and laser cutting processes.

The laminates obtained during STEP 12 of exemplary method 10 (FIG. 1) may each have a coating precursor layer formed thereon and, perhaps, one or more underlying oxidation barrier layers. This may be more fully appreciated by referring to FIG. 3, which is a cross-sectional view of laminate 14(a) taken along line 3-3 identified FIG. 2. As can be seen, two layers have been produced over one or more surfaces of laminate 14(a): (i) an oxidation barrier layer 32(a), and (ii) an overlying coating precursor layer 34(a). These layers are each discussed, in turn, below. The thicknesses of layers 32(a) and 34(a) are exaggerated in FIG. 3, which is not drawn to scale. Laminate 14(a), oxidation barrier layer 32(a), and coating precursor layer 34(a) are collectively referred to herein as a "coated laminate" and identified in FIG. 3 by reference numeral "36(a)." As a point of emphasis, layers 32(a) and 34(a) can be produced over laminate 14(a) after the laminate shape has been cut from a magnetically permeable sheet or panel (referred to here as "laminate singulation"). Alternatively, layers 32(a) and 34(a) can be formed over laminate 14(a) prior to laminate singulation; and, therefore, while laminate 14(a) remains interconnected with the other laminates as a relatively large, continuous panel. In this case, laminate 14(a) may then be cut from the panel in the above-described manner along with the other, non-illustrated laminates after formation layers 32(a) and 34(a) over the laminate panel. For example, in an implementation wherein layers 32(a) and 34(a) are produced on a first (coated) face of the panel, the panel may subsequently be singulated into individual laminates by cutting through the panel (e.g., via photo-etching, laser cutting, or EDM wire cutting) from its opposing, uncoated side.

Oxidation barrier layer 32(a) can be composed of any material, which decreases the propensity of laminate 14(a) to oxidize when exposed to air or another oxidizing ambient at elevated temperatures. As a first example, oxidation barrier layer 32(a) can be produced by plating metal (e.g., nickel) over opposing principal surfaces 26(a) and 28(a) of laminate 14(a) and, perhaps, over sidewalls surfaces 22(a) and 24(a), as well. Alternatively, as a second example, oxidation barrier layer 32(a) can be produced by forming a Thermally-Grown Oxide (TGO) layer over laminate 14(a). Both of these approaches are discussed more fully below. In still further embodiments, an oxidation barrier coating system can be formed over the laminates, which may include both a plated metal layer and an underlying TGO layer. If desired, the surfaces of laminate 14(a) can be pre-roughed using, for example, a chemical etch, a wet blast, or another roughening technique, prior to application of oxidation barrier layer 32(a) to promote adhesion to laminate 14(a). Oxidation barrier layer 32(a) may have a thickness between about 0.1 and about 10.0 μm and, preferably, between about 1 and about 3 μm in an embodiment. However, in other embodiments, oxidation barrier layer 32(a) may be thicker or thinner than the aforementioned ranges.

In a first group of embodiments, nickel or another metal is plated onto laminate 14(a) to produce oxidation barrier layer 32(a) utilizing either an electrolytic or an electroless plating process. In such embodiments, the preferred plating process may depend upon whether discrete laminates have already been cut from a metal panel at this juncture in the manufacturing process (whether laminate singulation has been performed) or, instead, the laminates remain interconnected as a panel. In implementations wherein the laminates have already undergone singulation and thus exist in their final form (shown in FIG. 2), oxidation barrier layer 32(a) is preferably produced utilizing electroless plating rather than electroplating, which can produce an uneven build-up of the plated layer at and around the laminate edges (commonly referred to as "dog-boning"). In contrast, when the laminates are processed in panel form prior to singulation, the outer edges of the panel at which dog-boning may occur will typically be removed as scrap during the subsequently-performed singulation process. Thus, in this latter case, electroplating can be utilized to produce an oxidation barrier layer 32(a) for cost savings. In either case, heat treatment may be performed after metal plating to diffuse the plated metal layers into the body of laminate 14(a) and the other, non-illustrated laminates.

In a second group of embodiments, oxidation barrier layer 32(a) is formed by the thermal growth of an oxide layer over at least opposing surfaces 26(a) and 28(a) of laminate 14(a). For example, oxidation barrier layer 32(a) can be a TGO layer formed over one or more surfaces of laminate 14(a) by heating laminate 14(a) to elevated temperatures (e.g., temperatures ranging from about 700 to about 850° C.) in an oxidizing atmosphere. The other non-illustrated laminates may also be subject to such a thermal growth process to concurrently form TGO layers thereon. Oxidation barrier layer 32(a) can be formed after panel singulation such that laminate 14(a) is imparted with in its final form (shown in FIG. 2), in which case layer 32(a) may extend over sidewall surfaces 22(a) and 24(b) in addition to principal surfaces 26(a) and 28(a). Alternatively, oxidation barrier layer 32(a) can be formed over laminate 14(a), while laminate 14(a) remains integrally joined to the other laminates as a precut sheet or panel. In this latter case, oxidation barrier layer 32(a) will typically not be formed over sidewall surfaces 22(a) and 24(a), which have not yet been defined by singulation of the panel. Finally, it will be appreciated that, while such the TGO layers are described herein as grown "over" or "on" the surfaces of laminate 14(a) for convenience of description, the TGO will grow both over and into the surfaces of laminate 14(a).

Figure 3:
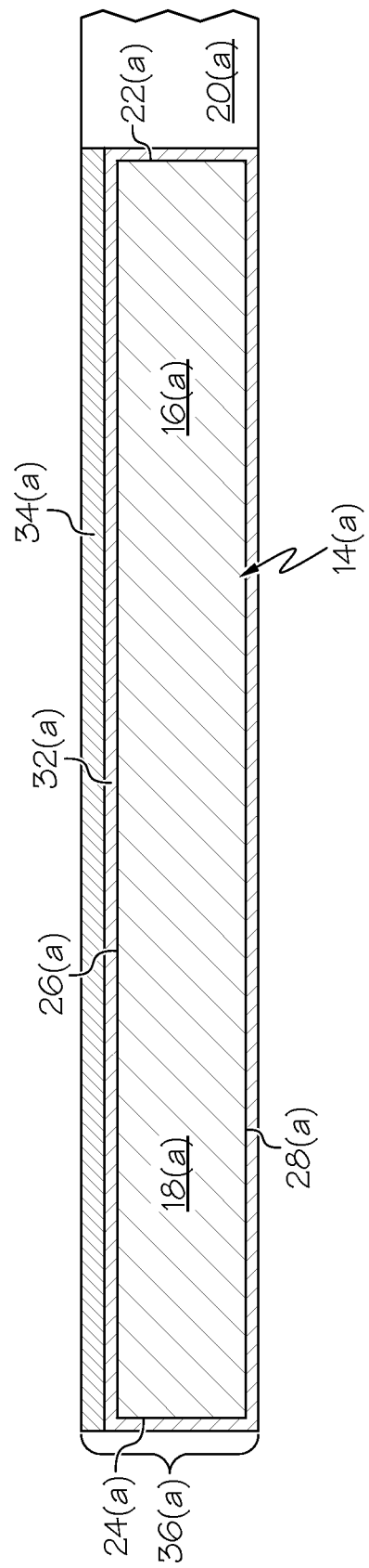

A description of the coating precursor layers will now be provided with reference to coating precursor layer 34(*a*) shown in FIG. 3 for coated laminate 36(*a*) and with the understanding that similar coating precursor layers are produced over the other non-illustrated laminates. As can be seen in FIG. 3, coating precursor layer 34(*a*) is applied over upper principal surface 26(*a*) of laminate 14(*a*) and directly onto oxidation barrier layer 32(*a*). A second coating precursor layer can also be deposited over lower principal surface 28(*a*) of laminate 14(*a*) in further embodiments, but this is not necessary as a second coating precursor will be positioned beneath laminate 14(*a*) during the below-described stacking process (providing that laminate 14(*a*) is not the bottommost laminate included in the laminate stack). Coating precursor layer 34(*a*) contains an inorganic dielectric material in particulate form. The inorganic dielectric particles contained within coating precursor layer 34(*a*) are preferably low melt glass particles; that is, glass particles having a softening point and, perhaps, a melt point less than the melt point of the magnetically-permeable material from which the laminates are produced. For this reason, the following will primarily describe the particles contained within coating precursor layer 34(*a*) and the other non-illustrated coating precursor layers as "glass particles." It is emphasized, however, that other types of inorganic dielectric particles can be contained within the coating precursor material in further embodiments, providing that the inorganic dielectric particles can be consolidated into interlaminate dielectric layers during a consolidative firing process of the type described below in conjunction with STEP 54 of method 10 (FIG. 1).

The inorganic dielectric (e.g., glass) particles contained within coating precursor layer 34(*a*) are ideally formulated for chemical compatibility with the laminate material such that the interlaminate dielectric layers produced by consolidating the inorganic dielectric particles in the below-described manner are resistant to the laminate ion migration. It is also desirable for the coefficient of thermal expansion (CTE) of the inorganic dielectric particles to be generally matched to the CTE of the laminate material, which may be between about 11 and about 20 parts per million per degree Celsius (PPM per ° C.) in an embodiment. In embodiments wherein a disparity exists between the CTEs of the inorganic dielectric particles and the laminate material (as will often be the case), it is preferred the materials are selected such that the inorganic dielectric particle CTE is equal to or less than the CTE of the laminate material, which may range from about 10 PPM per ° C. to about 20 PPM per ° C. in an embodiment. In this regard, it is preferred that the CTE of the inorganic dielectric particles is greater than or equal to a minimum CTE threshold and less than the CTE of the laminate material. In one embodiment, and by way of non-limiting example only, the minimum CTE threshold of the inorganic dielectric particles is equal to 9 PPM per ° C.

Coating precursor materials containing inorganic dielectric (e.g., glass) particles suitable for usage in forming coating precursor layer 34(*a*) can be found in a special class of materials referred to as "ceramic-on-metal dielectrics," which have recently been developed for usage in other applications. It has been found that ceramic-on-metal dielectrics formulated for usage in conjunction with 300 and 400 series stainless steels are well-suited for usage as the coating precursor material (or as a base from which the coating precursor material is formed) when, for example, a Fe—Co alloy is selected as the laminate material. At present, ceramic-on-metal dielectrics suitable for this purpose are available from the following commercial suppliers: ELECTRO-SCIENCE LABROTRIES, INC., headquartered in King of Prussia, Pa.; the FERRO CORPORATION, headquartered in Mayfield Heights, Ohio; and HERAEUS PRECIOUS METALS headquartered in Conshohocken, Pa. In certain cases, a ceramic-on-metal dielectric material can be acquired and then modified by the addition of one or more refining ingredients to produce a coating precursor material, which is then applied onto laminate 14(*a*), dried, and possibly prefired to form coating precursor layer 34(*a*). In this case, additional amounts of a solvent or liquid carrier can be added to optimize the coating precursor material for wet state application onto the laminates (described below). Additionally or alternatively, an acrylic resin or other material can be added to increase the strength of the coating precursor material when dried and possibly prefired.

Within continued reference to FIGS. 1-3, coating precursor layer 34(*a*) can be applied to laminate 14(*a*) utilizing either a wet state application technique or a dry state application technique. When a wet state application technique is used, a flowable or wet state coating precursor material is first obtained by, for example, independent production or purchase from a third party supplier. The wet state coating precursor material may contain inorganic dielectric particles dispersed within an organic binder, such as ethyl cellulose or an acrylic. Additionally, the coating precursor material may contain a solvent or liquid carrier transforming the precursor material to a wet or flowable state. Suitable solvents or liquid carriers include high molecular weight alcohols resistant to evaporation at room temperature, such as alpha-terpineol or TEXINOL®. The volume of solvent or liquid carrier contained within the coating precursor material can be adjusted to tailor of the viscosity of the precursor material to the selected wet state application technique. For example, in embodiments wherein the precursor material is applied by screen printing or doctor blading, the coating precursor material may contain sufficient liquid to create a paste or slurry.

Screen printing is a preferred wet state application technique in view of its ability to provide excellent thickness uniformity and minimize waste. In one embodiment, a glass-containing paste is applied to laminate 14(*a*) at a predetermined thickness (e.g., between 10 and 20 µm), which may be approximately twice the final desired thickness of the interlaminate dielectric layers produced from the coating precursor layers, as described below. The thickness of the paste layer can be minimized by utilizing an ultrafine commercial screen and/or by reducing the weight percentage of solids in the paste by, for example, increasing the binder and solvent content. Additionally, calendaring can be employed to reduce the thickness of the paste layer. As a still further possibility, paste layer can be printed in a pattern providing less than 100% surface area coverage providing that non-covered areas are small enough the inorganic dielectric (e.g., glass) particles would flow over entire substrate when wet, fired, or pressed, as described below. The foregoing notwithstanding, wet state application techniques other than screen printing can also be employed to apply a coating precursor layer 34(*a*) to laminate 14(*a*). Such alternative wet state application techniques include spraying, dipping, and doctor blade application. In the case of spraying and dipping, the coating precursor material may be diluted to a paint-like consistency prior to application onto laminate 14(*a*) and the other non-illustrated laminates. After application of the wet state coating material, a drying process can be carried-out to remove excess liquid from the coating material. In one embodiment, drying is performed at room temperature or at an elevated temperature utilizing an oven or heat gun. Coating precursor layer 34(*a*) results.

In further embodiments, a dry state application technique can be employed to apply coating precursor layer 34(*a*) to laminate 14(*a*). For example, a transfer process or "green tape lamination" process can be utilized wherein coating precursor layer 34(*a*) is first deposited (e.g., screen printed or doctor bladed) and dried onto a temporary substrate or carrier, such as a tape backing (e.g., a strip of Mylar®). In this case, the binder content of the coating precursor material may be increased to, for example, about 8-10 weight percent (wt %) for additional strength. The coating precursor layer 34(*a*) and the tape backing may be positioned over laminate 14(*a*), and inverted to place layer 34(*a*) in contact with oxidation barrier layer 32(*a*). Heat and possibly pressure is then applied to adhere oxidation barrier layer 32(*a*) to oxidation barrier layer 32(*a*) and allow removal of the tape backing by, for example, physically peeling the tape away. The structure shown in FIG. 3 results.

Although not necessary, coated laminate 36(*a*) and the other non-illustrated coated laminates may be subject to a pre-firing process in certain implementations of method 10 (FIG. 1). When performed, pre-firing enables organic materials contained within coating precursor layer 34(*a*) to be decomposed or burned-out prior to laminate stacking. In so doing, pre-firing can advantageously shorten the manufacturing process by avoiding the need to perform such a burnout step during the below-described consolidative firing process when the coating precursor layer 34(*a*) and the other coating precursor layers are largely shielded from the ingress of oxygen. Pre-firing may entail heating the coated laminates to an elevated temperatures at which the organic binder (and any other organic materials) in the coating precursor materials decomposes, while exposing the coated laminates to air or another oxygen-containing environment. Pre-firing can typically be performed in a relatively short period of time on the order of, for example, 30 to 60 minutes. In one implementation, the coated laminates are transported through a belt furnace, which heats the laminates to a predetermined maximum temperature for a time period sufficient to decompose substantially all organic material from the coating precursor layers; the term "substantially all" denoting that at least 99 wt % of the organic material is removed from the coating precursor materials. In certain embodiments, the pre-firing step will be performed at highly elevated temperatures (e.g., from about 700 to about 850° C.) sufficient to glaze, sinter, or slightly melt the inorganic dielectric particles to help strengthen the post-fired coating precursor layers, which may otherwise be weakened when the organic binder is decomposed therefrom. Such highly elevated temperatures causing sintering of the inorganic dielectric (e.g., glass) particles are referred to herein as "sintering temperatures." Coating precursor layer 34(*a*) is still considered to contain inorganic dielectric particles even when the particles are partially merged or sintered together as a result of such a pre-firing process. Advantageously, pre-firing the coated laminates at such temperatures may also serve to heat treat laminate 14(*a*) and the other non-illustrated laminates. Alternatively, the metal laminates can be heat treated utilizing an independent heat treatment step or, instead, as part of the below-described consolidative firing process.

Figure 4:
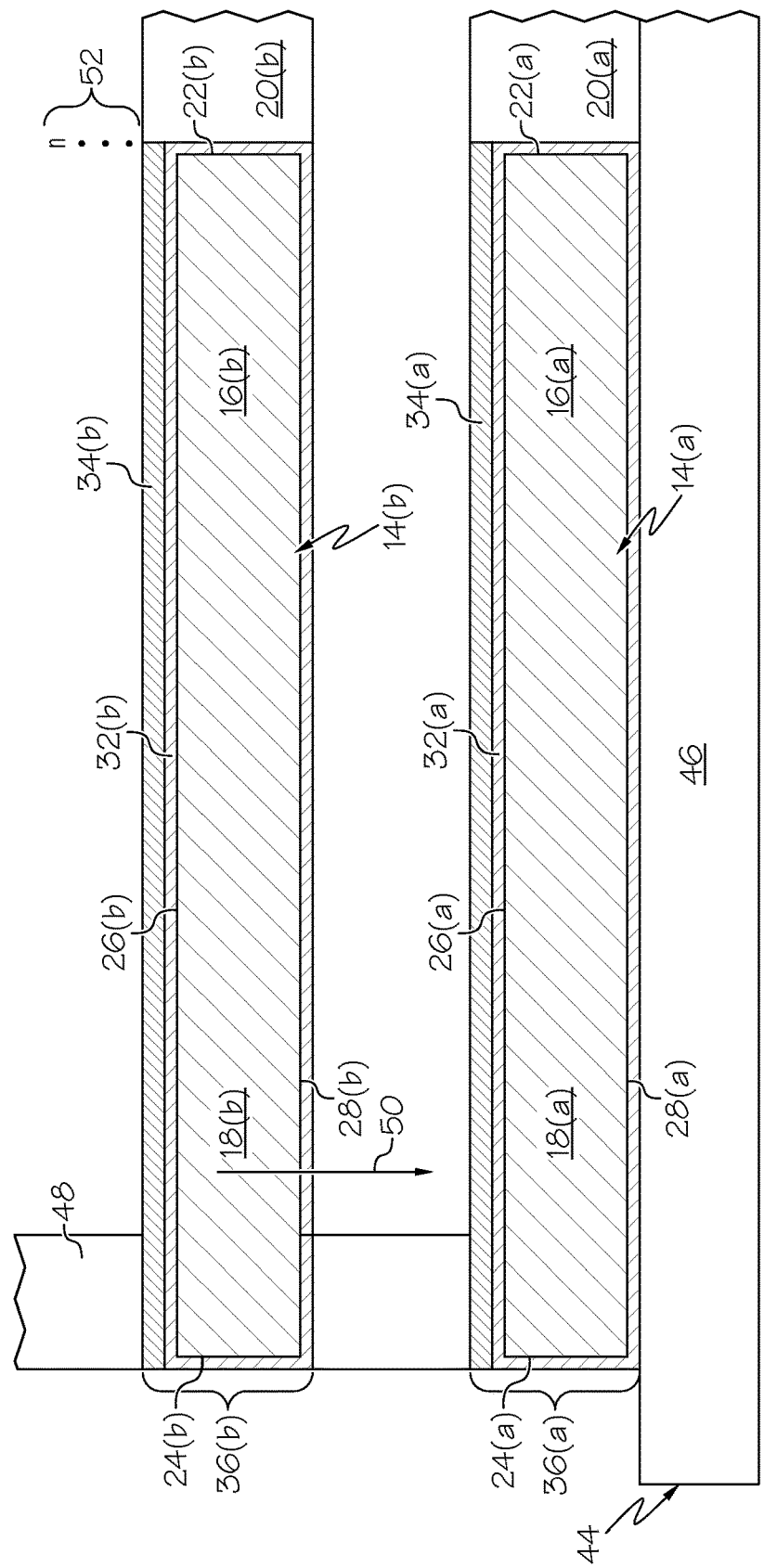
FIGS. 4-7 illustrate a high temperature laminated stator core at various stages of manufacture and produced in accordance with the exemplary manufacturing method set-forth in FIG. 1.

Advancing to STEP 40 of exemplary method 10 (FIG. 1), coated laminate 36(*a*) is next arranged in a laminate stack with a number of other laminates. During stacking, the coated laminates are laid-up in a vertically overlapping relationship such that the laminates are interspersed with or interleaved with the coating precursor layers. A fixture including locating pins or other register features is advantageously utilized during STEP 40 to ensure proper vertical alignment of the coated laminates. In this regard, FIG. 4 generically illustrates an exemplary fixture 44 including a base plate 46 and a plurality locating pins 48 (only one of which can be seen) suitable for usage during laminate stacking. In this example, coated laminate 36(*a*) is first loaded onto fixture 44 and rotated in a first rotational direction until one or more of lobes 18(*a*) contact locating pins 48. As indicated by arrow 50, a second coated laminate 36(*b*) is then loaded onto fixture 44, placed in contact with coating precursor layer 34(*a*) of coated laminate 36(*a*), and rotated into contact with pins 48 to ensure proper angular alignment with coated laminate 36(*a*). As indicated in FIG. 4 by symbol 52, this process is repeated until a desired number of laminates (e.g., a few dozen to several hundred laminates) has been loaded onto fixture 44. The laminates loaded onto fixture 44 are collectively referred to herein as "laminates 14," and the reference numbers used to denote the feature of coated laminate 36(*a*) are repeated for each of the illustrated laminates shown in FIGS. 4, 5, and 7 with appropriate changes to the parenthetical following each reference numeral.

After stacking laminates 14 into the laminate stack, the laminate stack undergoes a consolidative firing process (STEP 54, FIG. 1). During this process, the laminate stack is subject to a compressive loads and elevated temperatures sufficient to consolidate the inorganic dielectric (e.g., glass) particles contained within coating precursor layers 38 into coherent interlaminate dielectric layers, which are interleaved or interspersed with laminates 14 in an alternating arrangement. For example, as generically illustrated in FIG. 5 wherein the laminate stack is identified by reference numeral "58" and only partially shown as indicated by symbol 52, the non-consolidated laminate stack 58 can be enclosed in a hinged furnace jacket 56. Although not shown in FIG. 5 for clarity, an opening may be provided in the upper and/or lower ends of furnace jacket 56 to the ram portion of a hydraulic press to extend into jacket 56 and exert a controlled compressive load on laminate stack 58 (indicated in FIG. 5 by arrow 62), while stack 58 is heated to elevated temperatures indicated by heat line 60) in accordance with a predetermined heating schedule, as described below.

In other embodiments, a different means can be utilized to exert a convergent force or compressive preload on the laminate stack during firing; e.g., a bulk weight may be placed on top of the laminate stack during firing. In general, however, it is preferred that the compressive load is applied by an adjustable mechanism, such as a hydraulic press, such that the load can be varied during the consolidative firing process. For example, in one embodiment wherein binder remains in coating precursor layers 38 at the time of consolidative firing, a relatively light compressive may initially be applied until the binder softens to a plastic flow state. Afterwards, coating precursor layers 38 may be leveled by increasing the compressive load. The compressive load may then be reduced during organic burnout (if not previously performed), and then again increased to remove voiding during consolidation of precursor layers 38 into coherent dielectric layers. Finally, the compressive load can be reduced to a zero value during the cool down cycle. If desired, a number of laminate stacks can be placed in series or in parallel and simultaneously subjected to the consolidative firing process for increased efficiency.

If a pre-firing step was not previously performed such that an organic binder or other organic material is still present in coating precursor layers 38 (that is, layers 38 remain in a "green state"), an initial burnout phase can be carried-out during STEP 54 of exemplary method 10 (FIG. 1). During the initial burnout phase, laminate stack 58 may be exposed to a first predetermined temperature threshold for a sufficient period of time to decompose the organic material from coating precursor layers 38. The first predetermined temperature threshold may range from about 400 to about 500° C. in an embodiment. During this phase of the process, a relatively light convergent force can be applied to laminate stack 58 to maintain the relative positioning of laminates 14, while still permitting the ingress of oxygen to promote organic material burnout. In a preferred embodiment, such a burnout phase is performed under process conditions sufficient to remove substantially all organic material from coating precursor layers 38 such that the interlaminate dielectric layers described below are substantially devoid of the organic binder or any other organic material; that is, contain less than 0.1 wt % organic material. If pre-firing was performed during STEP 40 or the organic material was otherwise removed from the coating precursor material, the above-described initial burnout phase may not be performed.

After the initial burnout phase (if performed), laminate stack 58 may be fired to a second predetermined temperature threshold exceeding the first temperature threshold. The second temperature threshold may be equivalent to or greater than the softening point the inorganic dielectric (e.g., glass) particles contained within coating precursor layers 38 and less than the melt point of the laminate material. In certain cases, the second temperature may be greater than the melt point of the inorganic dielectric particles, which may be, for example, approximately 100° C. greater than the softening point of the particles. After the second temperature threshold is reached, the compressive load exerted on laminate stack 58 may be increased to a maximum value. This causes the inorganic dielectric particles contained within coating precursor layers 38 to flow into the voids between neighboring laminates 14, merge, and ultimately form a number of coherent interlaminate dielectric layers between laminates 14 (identified by reference numeral "72" in FIG. 5). The term "coherent" is thus utilized to indicate that the interlaminate dielectric layers 72 produced pursuant to consolidative firing are densified (less porous) as compared to the coating precursor layers and are substantially void free. Interlaminate dielectric layers 72 are interspersed or interleaved with laminates 14 in a vertically alternating relationship. Interlaminate dielectric layers 72 thus provide both electrical insulation between neighboring laminates 14 included within the laminate stack and bond the neighboring laminates together. For this reason, the post-firing or consolidated laminate stack may be referred to as a "laminated stator core" hereafter. Additional firing cycles may be performed, as needed. Furthermore, if the laminates have not yet been subjected to a metal heat treatment step, the consolidative firing process may also be controlled to heat treat the metal laminates as part of the consolidative firing process.

By way of non-limiting example, the final thickness of the interlaminate dielectric layers may range from about 5 to about 10 µm after consolidative firing. The interlaminate dielectric layer thickness will be less than that of the coating precursor layers, which may have an initial thickness between about 10 and about 20 µm when applied utilizing a wet state application technique of the type described above.

In many cases, the compressive load and temperatures applied during the consolidative firing process can be controlled to prevent laminate contact and impart the resulting interlaminate dielectric layers with the desired final thickness. However, when this is not the case or when it is desired to ensure that a minimum gap between the laminates is maintained, inorganic standoff particles can be added to the materials from which coating precursor layers 34 (FIG. 4) are formed. The inorganic standoff particles can be, for example, presorted, spherical particles having a softening point greater than the softening point and possibly greater than the melt point of the inorganic dielectric (e.g., glass) particles contained in the coating precursor material. Suitable materials include high melt glasses and ceramics, such as alumina. The inorganic standoff particles can be presorted utilizing, for example, cyclonic separation to limit the spheres to a tightly defined diameter range corresponding to the desired vertical standoff (as previously determined). Stated differently, presorted inorganic dielectric spheres having a maximum diameter substantially equivalent to the desired vertical standoff can be embedded within the coating precursor layers by, for example, mixing the spheres into the coating precursor material prior to application onto laminates 14. During the consolidative firing process, the processing temperatures are held below the softening point of the inorganic standoff particles to ensure the standoff particles maintain their rigidity and thus provide a physical spacer setting the vertical standoff between the laminates and defining the thickness of the resulting interlaminate dielectric layers 72. As a somewhat arbitrary example, in an embodiment wherein the desired minimum vertical standoff between neighboring laminates is 8 µm, presorted inorganic spheres having a maximum diameter of about 8 µm (and a minimum diameter somewhere below 8 µm) can be utilized as the inorganic standoff particles. In other embodiments, the coating precursor layers may lack such inorganic standoff particles.

Figure 5:
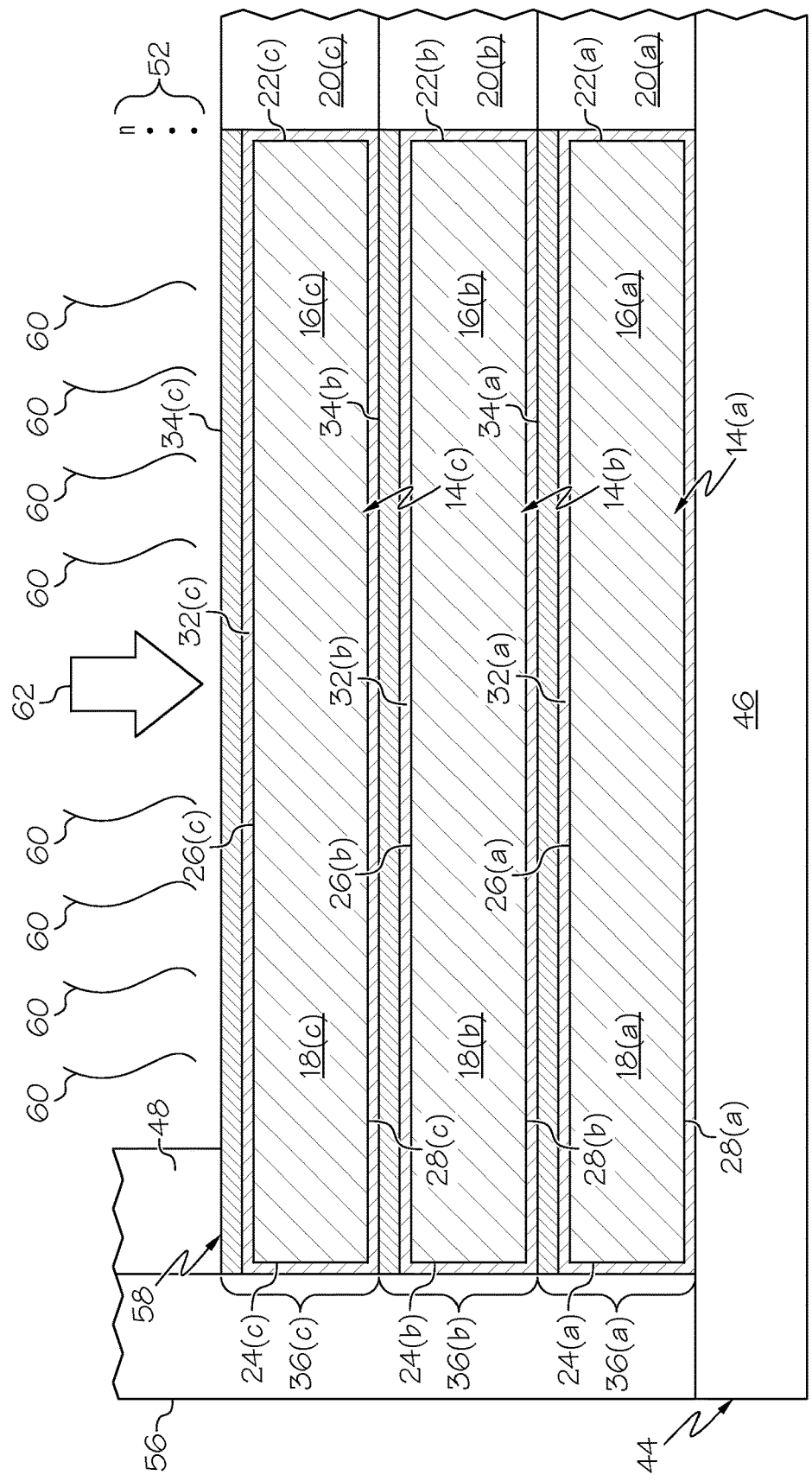
Figure 6:
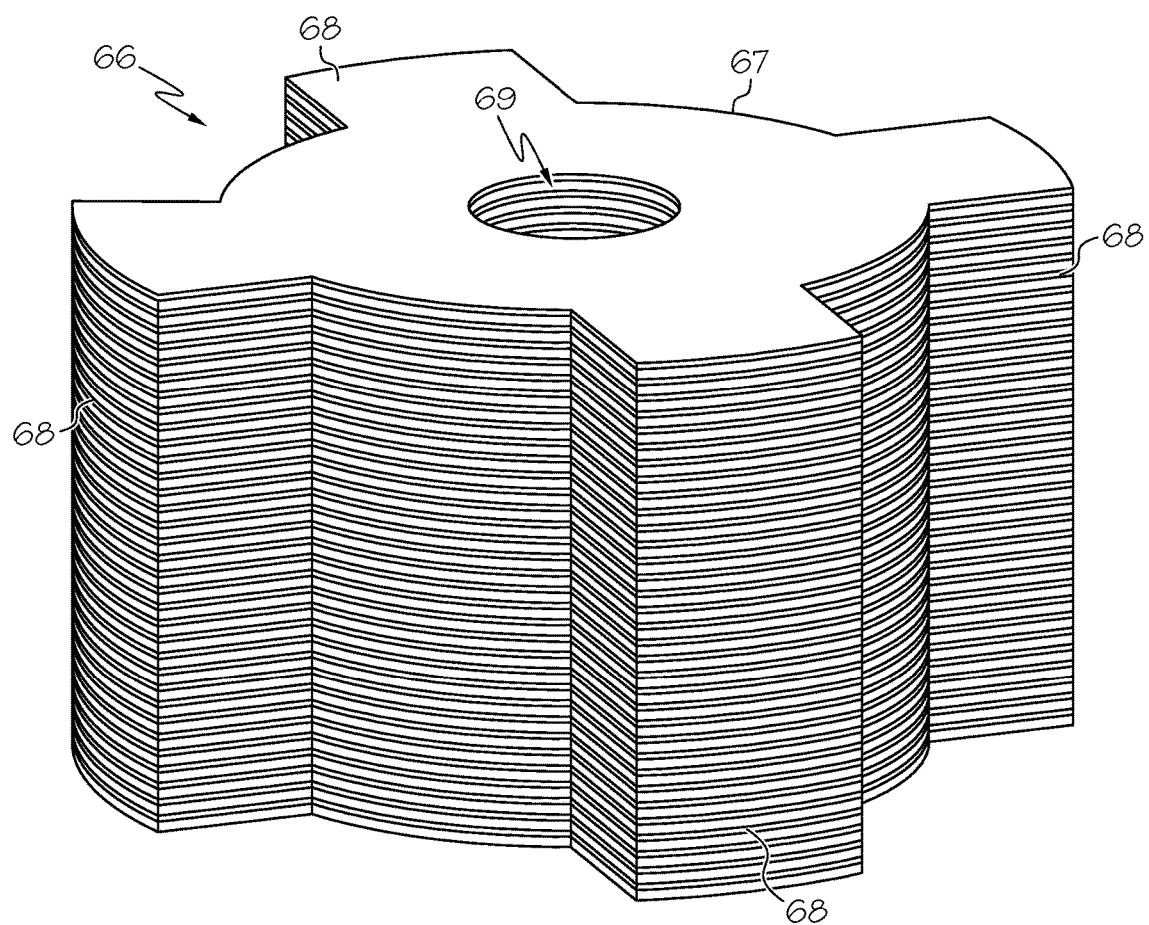
Figure 7:
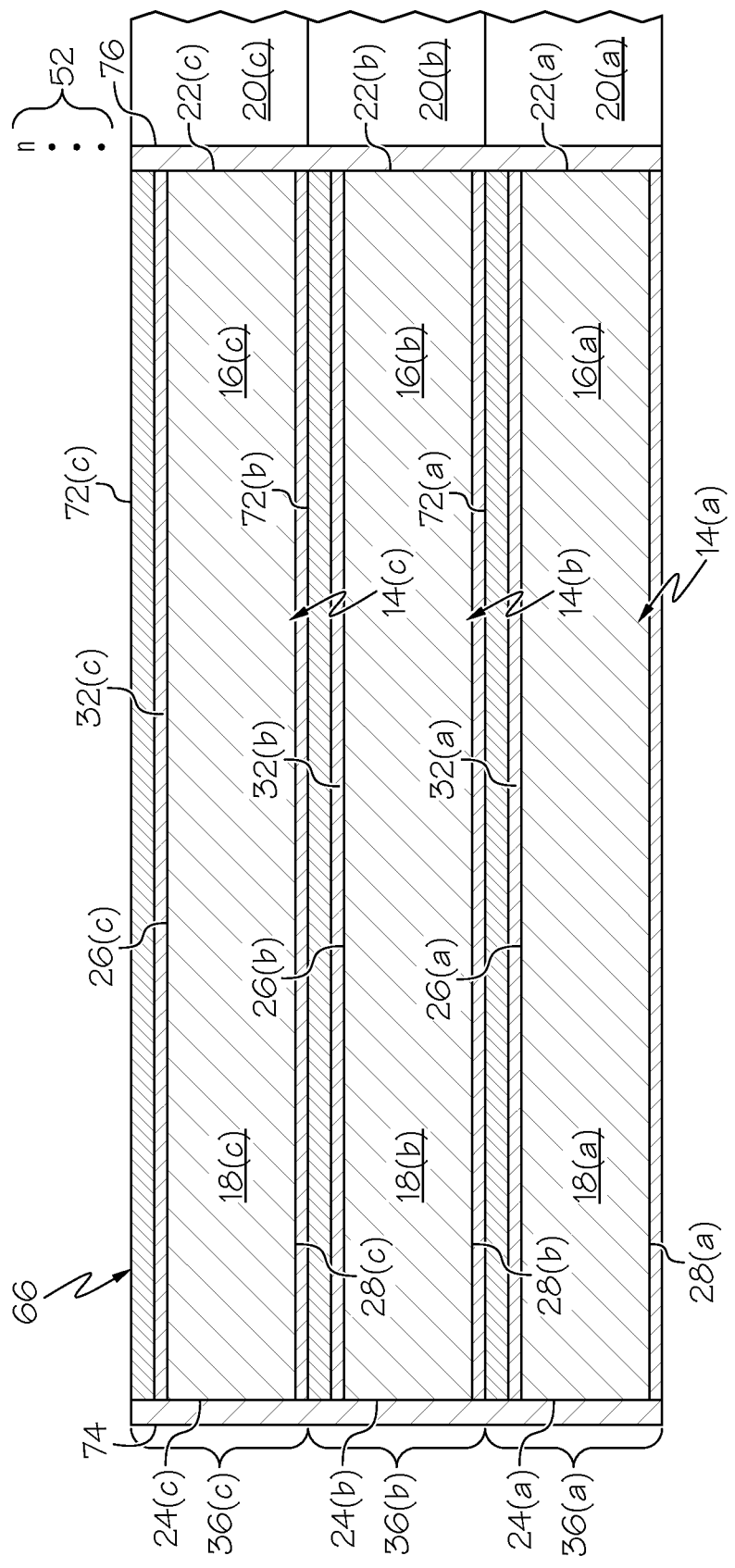

Continuing to STEP 64 of exemplary method 10 (FIG. 1), the laminated stator core is next allowed to cool to, for example, room temperature after consolidative firing. The laminated stator core is then removed from hinged furnace 56 (FIG. 5). The resultant structure is shown FIG. 6 wherein the laminated stator core is identified by reference numeral "66." As can be seen in FIG. 6, laminated stator core 66 includes a generally tubular body 67, a central opening or longitudinal channel 69 extending through body 67, and a number of stator posts 68 extending radially outward from body 67. Stator posts 68 are produced from the overlapping or aligning lobes of the individual laminates included within stator core 66. Additional processes can be performed to complete fabrication of the laminated stator core (STEP 70, FIG. 1). For example, one or more sidewall surfaces of the laminated stator core can be machined to final dimensions and then coated with an oxidation barrier, dielectric coating. This may be more fully appreciated by referring to FIG. 7, which illustrates a small number of the interlaminate dielectric layers 72 included in laminated stator core 66. As indicated in FIG. 7, inner sidewall 22 of laminated stator core 66 can be machined to a desired dimension and then an additional dielectric coating 76 may be applied thereover. In this case, dielectric coating 76 can contain an inorganic dielectric material having a softening point less than the softening point of the inorganic dielectric particles included in the coating precursor material. In this manner, laminated stator core 66 can be heated to a temperature less than the softening point of inorganic dielectric particles when forming dielectric coating 76 to prevent undesired shifting of laminates 14. Similarly, outer sidewalls 24 can be machined to a desired dimension and then an additional dielectric coating 74 can be applied thereover. This may be unnecessary, however, in embodiments wherein the laminated stator core is subsequently disposed in a casing or can such that outer sidewalls 24 are pressed against the inner surfaces of the can or otherwise shielded from oxygen exposure.

After production of the laminated stator core, additional steps can be performed to integrate the high temperature laminated stator core into an electromagnetic device, such as a motor, sensor, actuator, generator, or magnetic bearing. These additional steps can include the insertion of high temperature prefabricated electromagnetic coils over the stator posts; installation of the stator assembly in a housing using, for example, a shrink fit technique; potting the interior of the housing with an inorganic dielectric filler material; sealing the housing by, for example, welding a lid thereon; and positioning a rotor in the central opening of the stator assembly. Further description of such steps, high temperature electromagnetic coils advantageously combined with the laminated stator cores in manufacturing high temperature electromagnetic devices, and general discussion of high temperature electromagnetic devices can be found in the incorporated '476 patent application.

The foregoing has thus provided exemplary embodiments of laminated stator cores and methods for producing laminated stator cores capable of providing prolonged and reliable operation at highly elevated temperatures (e.g., temperatures >260° C.) at which organic materials tend to breakdown and decompose. In one embodiment, the method includes the steps or processes of depositing a glass-containing coating precursor layer onto one side (the coated side) of an alloy sheet or panel and cutting (e.g., photoetching) a plurality of coated laminates from the alloy panel from the opposing, uncoated side thereof. Prior to deposition of the glass-containing coating precursor layer, an oxidation barrier layer may be formed over the panel utilizing, for example, a thermal growth process or metal plating. If desired, pre-firing can be performed after deposition of the glass-containing coating precursor layer to decompose substantially all organic binder and other organic materials therefrom. Additionally, in certain cases, pre-firing can entail heating the coated laminates to a sintering temperature equal to or less than the softening point of the inorganic dielectric (e.g., glass) particles. The coated laminates are then laid-up in a stack and consolidated into the laminated stator core using heat and convergent pressures. In this manner, inorganic dielectric materials, such as a low melt glass, can be utilized to both electrically insulate and bond the laminates into a rigid stator assembly. The end result is a laminated stator core substantially devoid of organic materials and suitable for usage within high temperature applications at which conventional laminated stator cores rapidly fail. Embodiments of the laminated stator cores are consequently well-suited for integration into efficient electromagnetic devices utilized within high temperature environments, such as high temperature motors, generators, sensors (e.g., RVDTs and motor resolvers), actuators, and magnetic bearings.

While primarily described above in the context of a method for manufacturing a high temperature laminated stator core, it will be appreciated that the foregoing has also provided embodiments of a laminated stator core. In one embodiment, the high temperature laminated stator core includes a plurality of laminates each composed of a magnetically-permeable material, such as Fe—Co alloy. A plurality of interlaminate dielectric layers is interspersed or interposed with the plurality of laminates in an alternating relationship. The plurality of interlaminate dielectric layers electrically insulates and bonds together the plurality of laminates. Additionally, the plurality of interlaminate dielectric layers are composed of consolidated glass particles having a softening point less than the melt point of the magnetically-permeable material and further having CTE less than the CTE of the magnetically-permeable material. In certain cases, the plurality of interlaminate dielectric layers are produced from a coating precursor material containing glass particles and one or more organic materials, such as an organic binder. In such cases, substantially all of the organic materials may be decomposed from the interlaminate dielectric layers such that the dielectric layers are substantially devoid of organic material; that is, contain less than 1 wt % organic material. In further embodiments, the laminated stator core may also include a plurality of oxidation barrier layers interspersed with the plurality of laminates and the plurality of interlaminate dielectric layers. The plurality of oxidation barrier layers may be selected from the group consisting of a plurality of nickel-plated layers and a plurality of thermally-grown oxide layers.

While multiple exemplary embodiments have been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended Claims.

What is claimed is:

1. A method for manufacturing a high temperature laminated stator core, the method comprising:
   obtaining a plurality of coated laminates each comprising a laminate over which a coating precursor layer is formed, the coating precursor layer containing an organic binder and inorganic dielectric particles having a softening point;
   arranging the plurality of coated laminates in a laminate stack;
   firing the laminate stack at temperatures equal to or greater than the softening point of the inorganic dielectric particles, while applying a compressive force on the laminate stack to consolidate the inorganic dielectric particles into a plurality of coherent interlaminate dielectric layers electrically insulating and bonding together the plurality of coated laminates as the high temperature laminated stator core; and
   pre-firing the coated laminates to decompose substantially all of the organic binder from the coating precursor layers prior to arranging the plurality of coated laminates in the laminate stack, pre-firing comprising heating the coated laminates to a sintering temperature equal to or greater than the softening point of the inorganic dielectric particles.

2. The method of claim 1 wherein the plurality of coated laminates are each produced to further comprise an oxidation barrier layer between the laminate and the coating precursor layer.

3. The method of claim 2 wherein the oxidation barrier layer comprises one of the group consisting of a thermally-grown oxide layer and a plated metal layer.

4. The method of claim 1 wherein obtaining comprises:
obtaining the plurality of laminates, while the laminates remain interconnected as a laminate panel having first and second principal surfaces;
forming the coating precursor layer over the first principal surface of the laminate panel; and
cutting the laminate panel from the second, opposing surface to separate the laminate panel into the plurality of laminates.

5. The method of claim 4 further comprising forming an oxidation barrier over the laminate panel prior to forming the coating precursor layer thereover.

6. The method of claim 1 wherein obtaining comprises:
applying a coating precursor layer to each of the laminates utilizing a wet state application technique; and
drying the coating precursor layer to yield the coating precursor layer.

7. The method of claim 1 wherein obtaining comprises applying a coating precursor layer to each of the laminates utilizing a green tape lamination process.

8. The method of claim 1 further comprising selecting the inorganic dielectric particles to comprise low melt glass particles.

9. The method of claim 8 wherein the laminates are composed of a magnetically-permeable alloy having a first coefficient of thermal expansion (CTE), and wherein the method further comprises selecting the low melt glass particles to have a CTE less than the first CTE.

10. The method of claim 9 wherein the low melt glass particles are further selected to have a CTE greater than or equal to 9 parts per million per degree Celsius.

11. The method of claim 1 wherein firing comprises increasing the compressive load exerted on the laminate stack when the firing temperature surpasses a predetermined temperature threshold equal to or greater than the softening point of the inorganic dielectric particles.

12. The method of claim 1 further comprising:
determining a desired vertical standoff between neighboring laminates in the laminate stack; and
embedding presorted inorganic dielectric spheres having a maximum diameter substantially equivalent to the desired vertical standoff within the coating precursor layers.

13. The method of claim 1 further comprising:
machining at least one sidewall of the high temperature laminated stator core after firing; and
forming an additional dielectric coating over the sidewall after machining, the additional dielectric coating containing an inorganic dielectric material having a softening point less than the softening point of the inorganic dielectric particles.

14. The method of claim 1 wherein pre-firing comprises pre-firing the coated laminates at a maximum temperature between 700 and 850 degrees Celsius.

15. The method of claim 1 wherein the plurality of laminates is produced by singulation of a panel, and wherein the method further comprises:
forming an oxidation barrier layer over a surface of the panel; and
after forming the oxidation barrier layer, singulating the panel into the plurality of laminates utilizing a photoetching process.

16. The method of claim 15 wherein forming comprises electroplating a nickel layer on the surface of the panel to form the barrier layer prior to singulation of the panel.

17. The method of claim 15 wherein forming comprises depositing nickel layers over the plurality of laminates utilizing an electroless plating process following singulation of the panel.

18. The method of claim 1 further comprising depositing the coating precursor layer by screen printing a glass-containing paste over the plurality of laminates, the glass-containing paste deposited to have a predetermined thickness exceeding a thickness of the plurality of coherent interlaminate dielectric layers.

* * * * *